US010634807B2

(12) United States Patent
Tang et al.

(10) Patent No.: US 10,634,807 B2
(45) Date of Patent: Apr. 28, 2020

(54) DETERMINING BOREHOLE PARAMETERS USING ULTRASONIC AND MICRO-RESISTIVITY CALIPERS

(71) Applicant: Halliburton Energy Services, Inc., Houston, TX (US)

(72) Inventors: Yumei Tang, Tomball, TX (US); Yibing Zheng, Houston, TX (US); Zhanyu Ge, Waukesha, WI (US)

(73) Assignee: Halliburton Energy Services, Inc., Houston, TX (US)

( * ) Notice: Subject to any disclaimer, the term of this patent is extended or adjusted under 35 U.S.C. 154(b) by 165 days.

(21) Appl. No.: 15/755,153

(22) PCT Filed: Nov. 9, 2015

(86) PCT No.: PCT/US2015/059752
§ 371 (c)(1),
(2) Date: Feb. 26, 2018

(87) PCT Pub. No.: WO2017/082860
PCT Pub. Date: May 18, 2017

(65) Prior Publication Data
US 2018/0252837 A1  Sep. 6, 2018

(51) Int. Cl.
*G01V 3/24* (2006.01)
*E21B 47/08* (2012.01)
*E21B 47/12* (2012.01)

(52) U.S. Cl.
CPC ............ *G01V 3/24* (2013.01); *E21B 47/08* (2013.01); *E21B 47/082* (2013.01); *E21B 47/124* (2013.01)

(58) Field of Classification Search
CPC ... G01V 3/18; G01V 1/52; G01V 3/34; G01V 3/38; G01V 5/04; E21B 47/00; E21B 4/02; E21B 7/062
(Continued)

(56) References Cited

U.S. PATENT DOCUMENTS 4,072,200 A * 2/1978 Morris ............... E21B 7/04
175/45
4,933,640 A * 6/1990 Kuckes ............ E21B 47/02216
166/66.5

(Continued)

FOREIGN PATENT DOCUMENTS

EA          014303 B1    10/2010
RU       2444031 C2     3/2011

OTHER PUBLICATIONS

EP Application Serial No. 15908411.0, Extended European Search Report, dated Dec. 13, 2018, 9 pages.

(Continued)

*Primary Examiner* — Giovanni Astacio-Oquendo
(74) *Attorney, Agent, or Firm* — Gilliam IP PLLC

(57) ABSTRACT

A micro-resistivity caliper, in some embodiments, comprises a cylindrical body; multiple center electrodes, arranged circumferentially about the cylindrical body, to emit current into a borehole and toward a borehole wall; multiple focus electrodes to limit dispersion of the current emitted by the center electrodes, each of the focus electrodes surrounding a different center electrode; multiple return electrodes to receive the current emitted by the center electrodes, each of the return electrodes surrounding a different focus electrode; and one or more processors, coupled to the return electrodes, to determine one or more standoffs between the micro-resistivity caliper and the borehole wall based on the currents received from the multiple return electrodes.

20 Claims, 11 Drawing Sheets

(58) Field of Classification Search
USPC .................. 324/346, 333, 334, 338, 339
See application file for complete search history.

(56) References Cited

U.S. PATENT DOCUMENTS

| | | | |
|---|---|---|---|
| 5,502,686 | A | 3/1996 | Dory et al. |
| 6,539,293 | B2* | 3/2003 | Bachtiger ............... B61K 9/08 |
| | | | 701/20 |
| 6,618,322 | B1 | 9/2003 | Georgi |
| 6,661,207 | B2* | 12/2003 | Nelson ..................... H02H 3/46 |
| | | | 307/87 |
| 2002/0062992 | A1* | 5/2002 | Fredericks .............. E21B 47/00 |
| | | | 175/40 |
| 2002/0166699 | A1 | 11/2002 | Evans |
| 2006/0267594 | A1* | 11/2006 | Thompson ............. G01R 31/42 |
| | | | 324/520 |
| 2007/0007967 | A1 | 1/2007 | Itskovich et al. |
| 2007/0046290 | A1 | 3/2007 | Bespalov et al. |
| 2011/0199090 | A1 | 8/2011 | Hayman |
| 2011/0204897 | A1 | 8/2011 | Hu et al. |
| 2015/0012217 | A1 | 1/2015 | Legendre |

OTHER PUBLICATIONS

RU Application Serial No. 2018111420, First Office Action, dated Feb. 1, 2019, 7 pages.
PCT Application Serial No. PCT/US2015/059752, International Search Report, dated Feb. 15, 2016, 4 pages.
PCT Application Serial No. PCT/US2015/059752, International Written Opinion, dated Feb. 15, 2016, 10 pages.

\* cited by examiner

DETERMINING BOREHOLE PARAMETERS USING ULTRASONIC AND MICRO-RESISTIVITY CALIPERS

BACKGROUND

Ultrasonic logging-while-drilling calipers are often incorporated into drill strings to determine the shapes and diameters of the boreholes in which they are deployed. These calipers typically use ultrasonic transducers that emit ultrasonic waves in the direction of a borehole wall, and reflected waves are received by the same transducer in a pulse-echo configuration or, alternatively, by other ultrasonic transducers or sensors in a pitch-catch configuration. The collected data is subsequently used for various purposes—for instance, to generate images of the borehole wall. Ultrasonic calipers may be deployed for these and other purposes in a wide variety of drilling and wireline environments.

BRIEF DESCRIPTION OF THE DRAWINGS

Accordingly, there are disclosed in the drawings and in the following description systems and techniques for determining borehole parameters using ultrasonic and micro-resistivity calipers.

Figure 1:
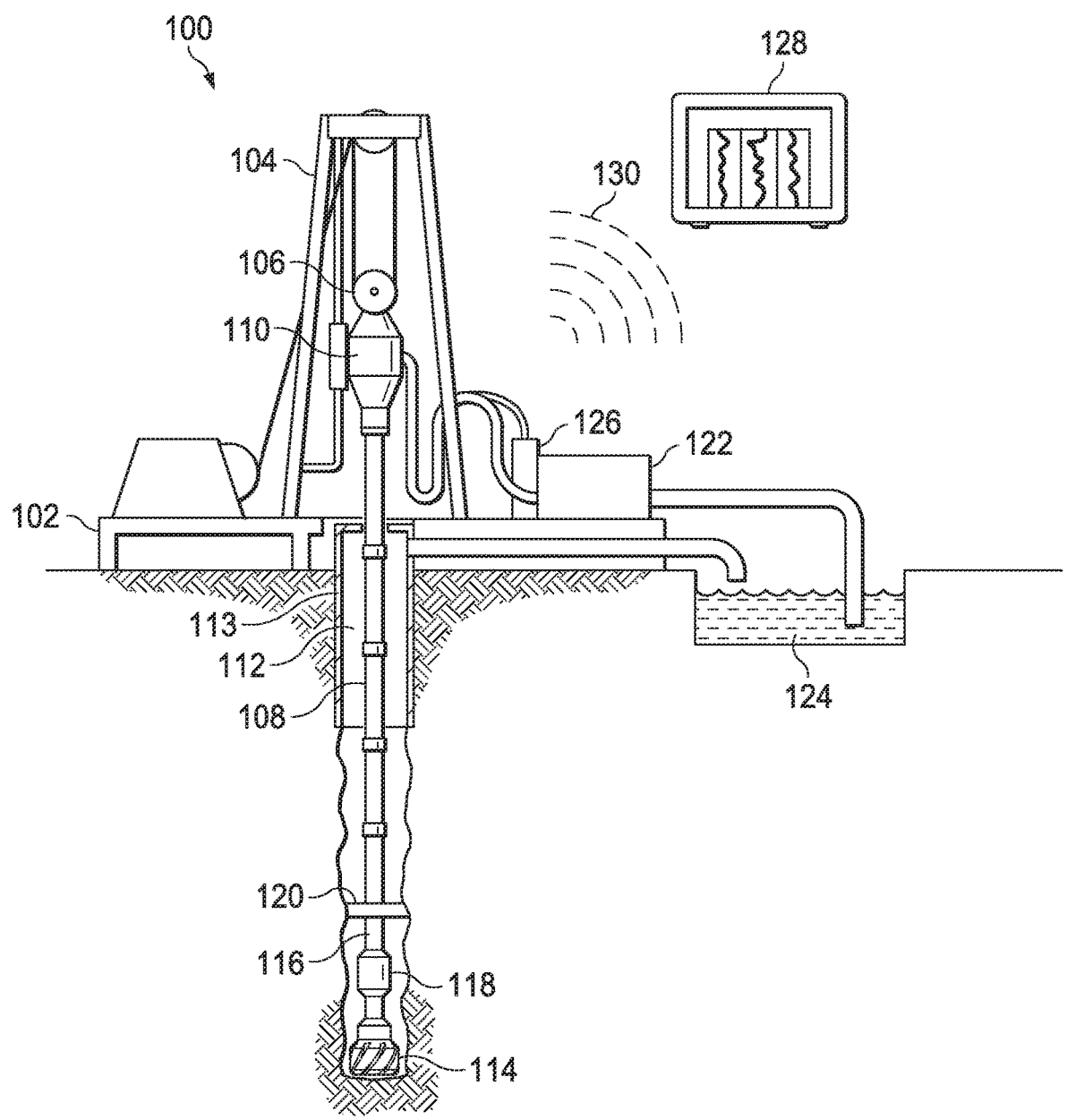
FIG. 1 is a schematic diagram of a logging-while-drilling (LWD) environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Micro-resistivity calipers, more so than ultrasonic calipers, are particularly well-suited for use in boreholes employing heavy, oil-based muds because such muds do not significantly attenuate the displacement currents induced by the micro-resistivity caliper. Accordingly, disclosed herein are embodiments of a micro-resistivity caliper for determining standoff distances ("standoffs") between the micro-resistivity caliper and the borehole wall. The disclosed embodiments use the standoffs, along with the radius of the caliper (including the widths of stabilizers upon which micro-resistivity sensors may be mounted) and the orientations of the micro-resistivity sensors, to determine the points on the borehole wall—relative to the center of the micro-resistivity caliper—upon which the induced micro-resistivity signals were incident. These points are subsequently used to mathematically determine the center of the borehole and the radius of the borehole. While the borehole radius and the location of the center of the borehole relative to the center of the caliper are useful quantities in and of themselves, the location of the center of the caliper relative to the center of the borehole effectively indicates the position of the caliper within the borehole. Thus, the borehole radius, the position of the caliper within the borehole, and/or the standoff distances may be used to correct an ultrasonic mapping of the contours of the borehole wall (i.e., a rugosity profile) in cases where the drill string or sonde on which the micro-resistivity and ultrasonic calipers are mounted is not centered in the borehole at the depth where ultrasonic caliper measurements are taken. These and related techniques are described in greater detail below.

FIG. 1 is a schematic diagram of a logging-while-drilling (LWD) environment 100. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. The stabilizer 120 may be a suitable location for installing certain types of measurement equipment—for example, the micro-resistivity caliper sensors described herein. A pump 122 circulates drilling fluid (e.g., a non-conductive, oil-based mud) through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 126. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased).

The drill collars in the BHA 116 are typically thick-walled steel pipe sections that provide weight and rigidity for the drilling process. The thick walls are also convenient sites for installing logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub contains one or more processors that coordinate the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable. Much of the data obtained by the control sub may be stored in memory for later retrieval, e.g., when the BHA 116 physically returns to the surface.

A LWD micro-resistivity caliper and/or an ultrasonic caliper may be integrated into the BHA 116 and/or onto the stabilizer(s) 120. In preferred embodiments, the micro-resistivity caliper uses sensors that are flush with the wall-facing surfaces of the stabilizers 120, as discussed in greater detail below. In some such embodiments, the ultrasonic caliper transducers (including sensors) are positioned within the drill string itself (as opposed to the stabilizers 120), also as described below. In at least some embodiments, the ultrasonic caliper sensors and the micro-resistivity caliper sensors are similarly oriented—e.g., they are azimuthally aligned with each other. As the drill bit 114 extends the borehole through the formations, the caliper(s) rotates and collects micro-resistivity and/or ultrasonic measurements. A processor or group of processors—which may be housed in a control sub in the drill string, within one or more of the calipers, elsewhere in the drill string, at the surface, or distributed among the foregoing locations and/or other locations—associates the caliper measurements with tool position and orientation measurements and processes the measurements as described below. The measurements can be stored in internal memory and/or communicated to the surface. All processors described herein operate according to executable instructions that are stored on a computer-readable medium that is accessible to one or more of the processors (e.g., a memory module). The computer-readable medium may be stored in the same location as the processor(s) accessing the medium (e.g., within a caliper). Alternatively, the medium may employ a distributed structure such that different portions of the medium are separately located. In some embodiments, the medium may be located separately from the one or more processors accessing the medium—for instance, a processor may be located within a sonde and it may have wireline access to a medium storing executable code at the surface. One or more processors that are said to be "coupled to" an apparatus—for example, a caliper—may be partially or even fully housed within that apparatus. Further, the term "coupled to" does not necessarily connote a direct, physical connection; two devices that are "coupled to" each other may be connected indirectly through one or more intervening devices.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing and display generation. The data processing unit may also contain storage to store, e.g., data received from tools in the BHA 116 via mud pulse telemetry or any other suitable communication technique. The scope of disclosure is not limited to these particular examples of data processing units.

Figure 2:
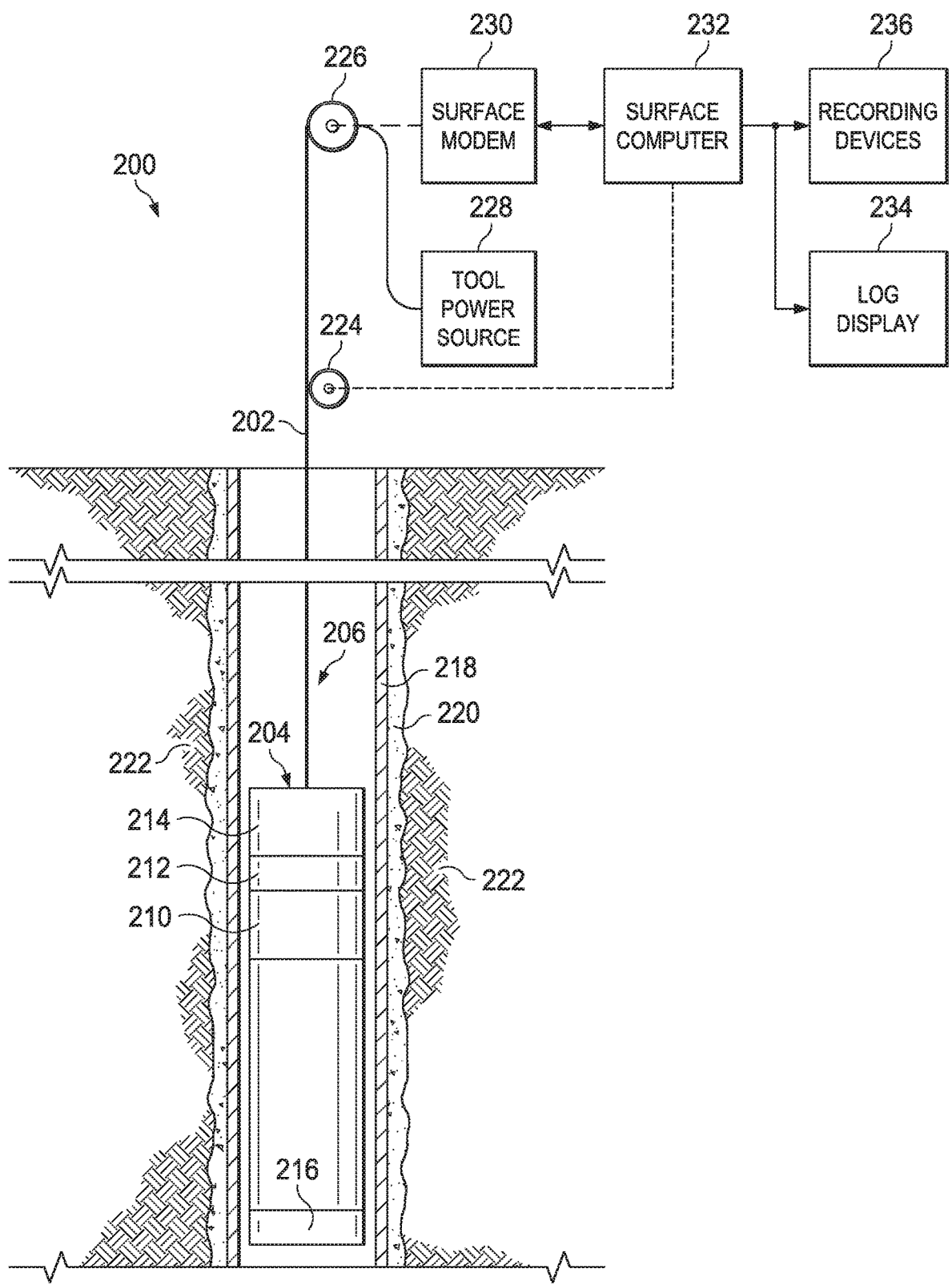
FIG. 2 is a schematic diagram of a wireline environment.

Although various embodiments are described below in the context of a drilling application, the disclosed techniques also may be applied in wireline contexts. FIG. 2 is a schematic diagram of an illustrative wireline environment 200. A logging cable 202 suspends a sonde 204 in a wellbore 206. Wellbore 206 is drilled by a drill bit on a drill string and is subsequently lined with casing 218 and an annular space 220 that contains, e.g., cement. Wellbore 206 can be any depth, and the length of logging cable 202 is sufficient for the depth of wellbore 206. The wellbore 206 may contain a fluid, such as an oil-based mud. Sonde 204 generally comprises a protective shell or housing that is fluid tight and pressure resistant and that enables equipment inside the sonde to be supported and protected during deployment. Sonde 204 encloses one or more logging tools that generate data useful in analyzing wellbore 206 or in determining various material properties of the mud and of the formation 222 in which wellbore 206 is disposed, such as a micro-resistivity or ultrasonic caliper 216. The sonde 204 may also house multiple transmitters and receivers (e.g., acoustic and/or electromagnetic) and their antennas. Output data streams from logging tools may be provided to a multiplexer 212 housed within sonde 204. Sonde 204 may include a communication module 214 having an uplink communication device, a downlink communication device, a data transmitter, and a data receiver.

Logging system 200 includes a sheave 224 that is used to guide the logging cable 202 into wellbore 206. Cable 202 is spooled on a cable reel 226 or drum for storage. Cable 202 couples with sonde 204 and is spooled out or taken in to raise and lower sonde 204 in wellbore 206. Conductors in cable 202 connect with surface-located equipment, which may include a DC power source 228 to provide power to tool power supply 210, a surface communication module 230 having an uplink communication device, a downlink communication device, a data transmitter and also a data receiver, a surface computer 232, a logging display 234 and one or more recording devices 236. Sheave 224 may be coupled by a suitable means to an input to surface computer 232 to provide sonde depth measuring information. The surface computer 232 comprises one or more processors and has access to software (e.g., stored on any suitable computer-readable medium housed within or coupled to the computer 232) and/or input interfaces that enable the computer 232 to perform, assisted or unassisted, one or more of the methods and techniques described herein. The computer 232 may provide an output for the logging display 234 and the recording device 236. In some embodiments, one or more processors that perform the techniques described herein are located within the sonde or at the surface, and in some embodiments, one or more processors that perform these techniques are distributed among the sonde, the surface, and/or other locations. The surface logging system 200 may collect data as a function of depth. Recording device 236 is incorporated to make a record of the collected data as a function of depth in wellbore 206.

As briefly mentioned above, in some embodiments, one or more processors and storage (e.g., any suitable computer-readable medium) may be disposed downhole within the sonde 204 and may be used either in lieu of the surface computer 232 or in addition to the computer 232. In such embodiments, storage housed within the sonde 204 stores data (such as that obtained from the logging operations described herein), which may be downloaded and processed using the surface computer 232 once the sonde 204 has been raised to the surface (e.g., in "slickline" applications). In some embodiments, one or more processors housed within the sonde 204 may process—as described herein—at least some of the data stored on the storage within the sonde 204 before the sonde 204 is raised to the surface. Because many of the embodiments described herein entail the use of both micro-resistivity and ultrasonic calipers to take measurements of the mud and/or borehole wall at the same depth, the drill string and/or sonde may be moved up or down as necessary to facilitate such measurements at identical depths.

Figure 3:
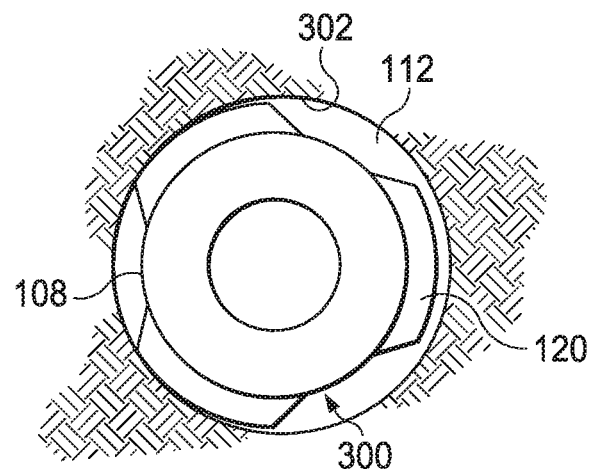
FIG. 3 is a cross-sectional view of a micro-resistivity caliper within a borehole.

FIG. 3 is a cross-sectional view of an illustrative LWD micro-resistivity caliper (or "tool") 300 mounted on a drill string 108 and in a borehole 112. Three stabilizers 120 maintain the drill string/caliper near the center of the borehole and, in so doing, minimize the standoffs between the wall-facing faces of the stabilizers 120 and the borehole wall 302. (The term "caliper," as used herein, refers to a tool used to perform the micro-resistivity and ultrasonic measurements described herein, including transducers with attendant sensors, electrodes, circuitry, connections, and the like. Calipers are mounted on or in drill string BHAs and stabilizers positioned in the vicinity of BHAs. In this disclosure, calipers are typically described in the context of drill strings, but one of ordinary skill in the art will recognize how to implement calipers in wireline sondes as well.) In at least some embodiments, the stabilizers 120 are evenly spaced about the circumference of the drill string (e.g., spaced 120 degrees apart in the case of three stabilizers). The stabilizers 120 do not necessarily maintain the drill string at the precise center of the borehole at all times. As the drill string rotates and progresses downhole at the drilling rate, each sensing surface will trace a helical path along the borehole wall. Orientation sensors within the drill string can be used to associate measurements (e.g., apparent resistivity measurements) with the sensors' positions along the borehole wall. One or more processors collect external measurements (e.g., apparent resistivity measurements), orientation (azimuth) measurements, and drill string position measurements and process the collected measurements as described below.

Figure 4:
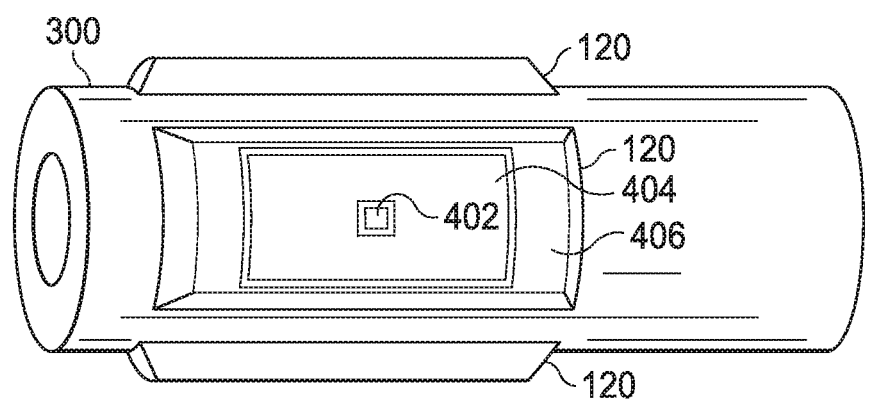
FIG. 4 is a perspective view of a micro-resistivity caliper.

FIG. 4 is a perspective view of an illustrative caliper 300. Caliper 300 comprises a drill string collar (e.g., a thick-walled steel tubular) having two or more equally-spaced stabilizers 120 that act to equalize the standoffs between the caliper's sensing surface(s) and the borehole wall. As shown in FIG. 4, the sensing surface includes a center electrode 402 surrounded by a focus electrode 404, which, in turn, is surrounded by a return electrode 406. As shown, the sensing surface is positioned on the wall-facing surface of stabilizer 120. In the illustrative implementation, the center electrode 402 is a square approximately one inch across. The width of the insulating gaps on the sensor face is no more than 0.2 inches. The focus electrode 404 is rectangular with a width of approximately six inches and a height of approximately twelve inches. The focus electrode 404 is maintained at essentially the same potential as the center electrode 402 to direct the measurement currents deeper into the formation. The main body of the caliper 300 serves as the return electrode 406, but a return electrode need not be any larger (in terms of surface area) than the focus electrode 404. Thus, for instance, a rectangularly-shaped annular electrode having dimensions of about 10×16 inches would be sufficient for the illustrated caliper. The caliper is not limited to having square or rectangular electrodes. Circular or elliptical electrodes may also be suitable. Moreover, the dimensions can also be adjusted to balance measurement resolution with tolerance for larger standoffs.

FIG. 4 shows the return electrode 406 completely surrounding the focus electrode 404. However, it is possible to achieve similar measurement quality with gaps in the return electrode 406, as long as the return electrode 406 substantially surrounds the focus electrode 404. In this context, the term "substantially" means that each gap occupies less than 30 degrees of arc as measured from the center of the center electrode 402. Similarly, the focus electrode 404 need only substantially surround the center electrode 402.

Figure 5A:
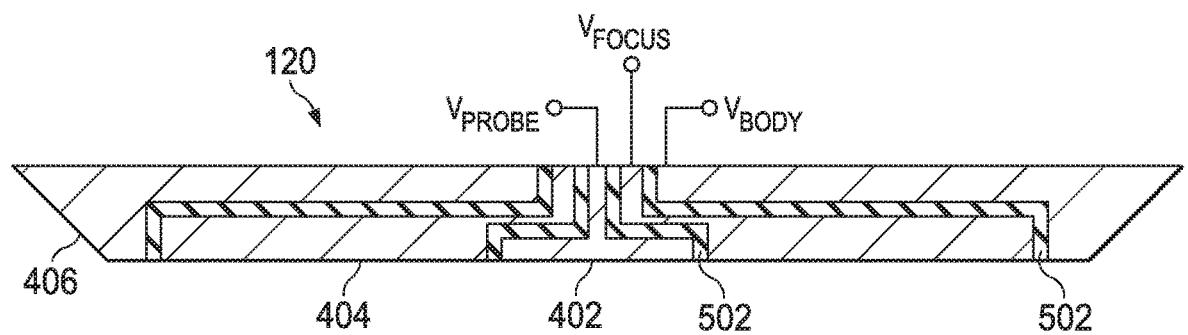
FIG. 5A is a cross-sectional view of a stabilizer.

FIG. 5A is a cross-sectional view of a stabilizer 120, showing layers of insulating material 502 separating the center electrode 402 from the focus electrode 404, and separating the focus electrode 404 from the return electrode 406. In some embodiments, the electrodes are made of steel, though other conductive materials can be used so long as they are rugged enough to withstand the rigors of the drilling environment. In the illustrative embodiments, a polyetheretherketone (PEEK) material is used to form the insulating layers, but other insulating materials can also be used. Because the focus electrode is maintained at essentially the same potential as the center electrode, the thickness of the insulating layers can be minimized without undue concern for capacitive coupling between the center electrode and the return electrode. A cavity may be positioned in the wall of the drill collar underneath the stabilizer 120 to hold sensor circuitry (described below with respect to FIGS. 7 and 8).

Figure 5B:
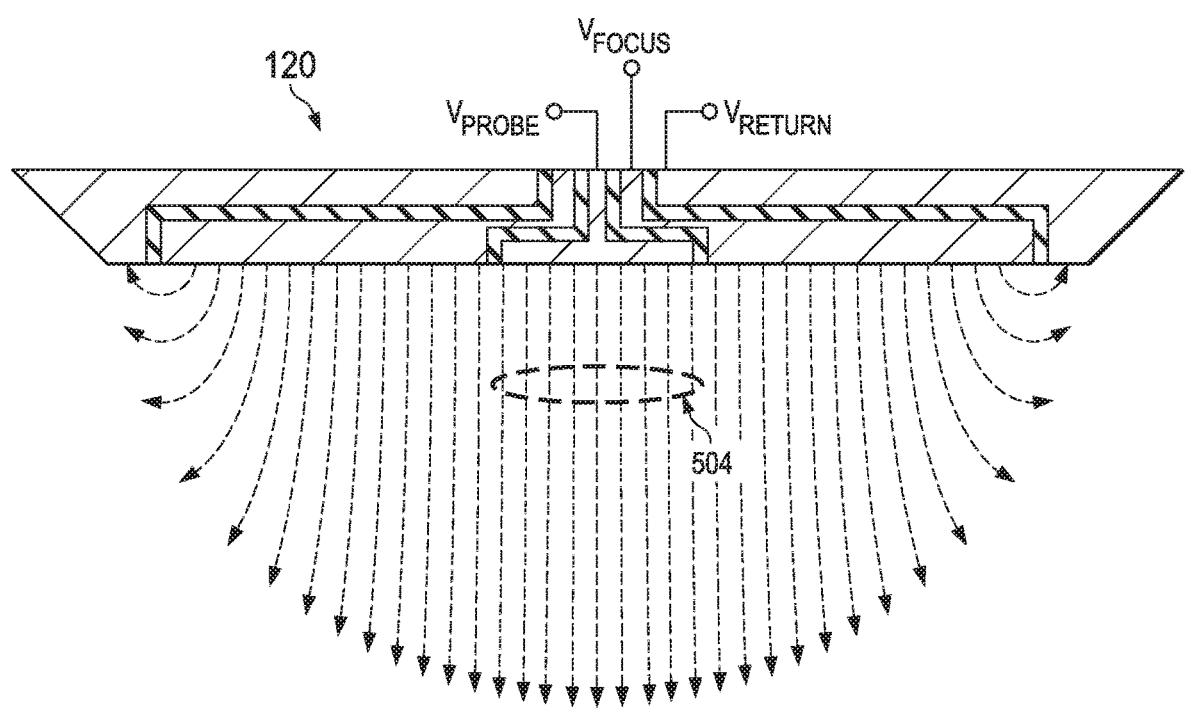
FIG. 5B is a cross-sectional view of a current flow field.

FIG. 5B is a cross-sectional view of an alternating current flow field that demonstrates the purpose of the focus electrode 404. The focus electrode 404 isolates the center electrode from non-uniformities in the electrical field, causing the electrical field lines 504 emanating from the center electrode to pass through the mud gap and enter the formation at right angles to the center electrode surface. Stated another way, the dispersion of current flow caused by the mud gap is strongly limited in the region near the center electrode, thereby preventing a loss of resolution. Because the alternating current flow from the center electrode 402 is most strongly concentrated in the immediate vicinity of the center electrode, the formation apparent resistivity in this region dominates the measurement. The shape of the measurement region is further controlled by locating the return electrode 406 immediately adjacent the focus electrode 404.

Figure 6:
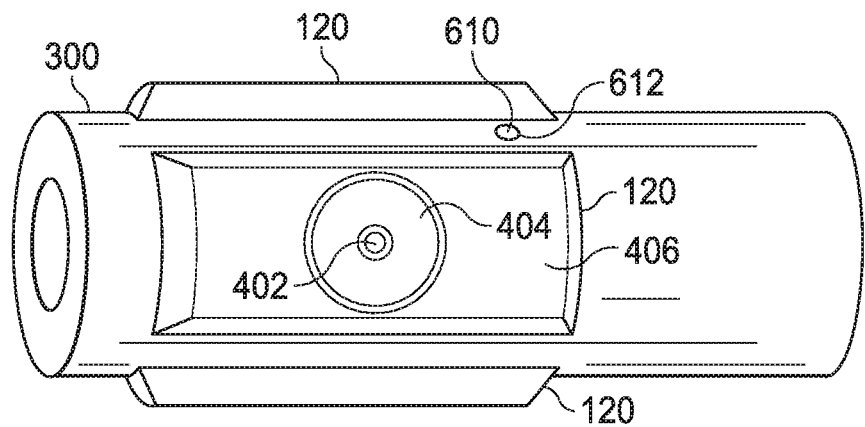
FIG. 6 is a perspective view of a micro-resistivity caliper.

FIG. 6 is a perspective view of another illustrative micro-resistivity caliper in which the center electrode 402 has a circular shape approximately one inch in diameter and the focus electrode 404 has a circular shape with an outside diameter of approximately three inches. The illustrated embodiment further includes a mud cell comprising a button electrode 610 surrounded by a thin ring electrode 612. The mud cell is intended to measure mud resistivity and capacitance, and hence it is recessed or located between stabilizers 120 to prevent close contact with the borehole wall. In the illustrative embodiment, the button electrode 610 is about ⅛ inch and the ring electrode 612 is approximately 0.01 inches thick.

Figure 7:
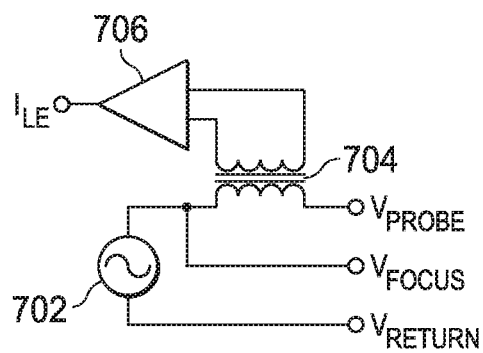
FIG. 7 is a schematic diagram of a sensing circuit.

Both the formation sensing surface and the mud cell can be driven with similar circuitry. FIG. 7 is a diagram of an illustrative circuit for driving the sensing surface. A power source 702 drives a high frequency voltage between the return electrode and the other electrodes. In some embodiments, the contemplated signal frequencies range between 1 MHz and 100 MHz. The drive signal magnitude is dependent on the sensitivity of the sensing amplifier, but the currently contemplated voltages range from 20 V to 200 V.

The connection between source 702 and the center electrode ($V_{PROBE}$) is provided with a current sensing circuit that includes a transformer 704 and a sensing amplifier 706. Transformer 704 converts the current flow from the center electrode into a voltage signal that is applied to high impedance inputs of sensing amplifier 706. The voltage at the output of the sensing amplifier is sampled and digitized by a microcontroller to measure the current flow. The apparent formation resistivity $R_A$ can then be determined in accordance with Ohm's law:

$$R_A = kV/I \qquad (1)$$

where k is a calibration constant, V is the magnitude of the power source 72, and I is the in-phase magnitude of the current flow from the center electrode. The impedance of the sensing circuit formed by transformer 704 and the amplifier 706 is kept low so as to keep the voltage relations $V_{PROBE} = V_{FOCUS} = V_{RETURN}$ as accurate as feasible.

Figure 8:
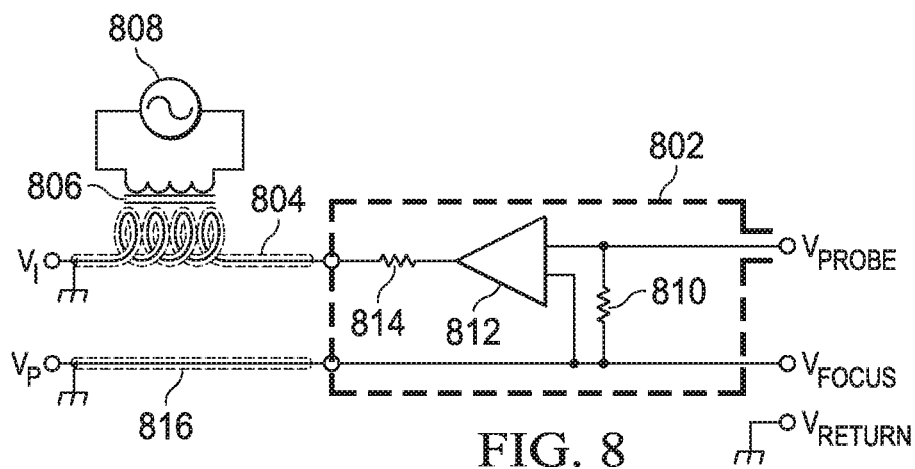
FIG. 8 is a schematic diagram of a formation sensing circuit.

FIG. 8 is a schematic diagram of a formation sensing circuit. Specifically, it shows an illustrative implementation of the circuitry for the sensing surface and mud cell, designed to minimize cross-talk between the source and detector circuitry. The focus electrode is preferably the front surface of a conductive box 802 that almost entirely encloses detection circuitry that includes a resistance (or impedance) 810, a low noise amplifier (LNA) 812, and an impedance matching resistor 814. The conductive box 802 surrounds (but does not enclose) the measurement electrode (denoted by $V_{PROBE}$ in FIG. 8). The only other breach in the surface of box 802 is to enable control/power and signal wires enclosed within a shield 804 to enter and exit box 802. Shield 804 is designed to attenuate radio frequency interference from transmit source 808.

Transmit source 808 drives an illustrative 2 MHz, 20 volt signal to the conductive box 802. Because the focus electrode 404 is part of the conductive box, the signal potential appears on the focus electrode. The conductive box 802 can be driven by a direct electrical connection from source 808, or—as shown in FIG. 8—via a transformer 806 that couples the signal to shield 804, which in turn is electrically connected to box 802. The wires inside the shield 804 do not experience interference from the drive signal flowing on the outer surface of the shield.

The measurement electrode 402 is coupled to the focus electrode 404 via a small impedance 810 (such as a 50 ohm resistor). The LNA 812 senses the voltage drop resulting from current flow through impedance 810, and it drives the amplified voltage through an impedance matching resistor 814 to a signal line passing through shield 804. Thus, the voltage at node $V_1$ represents a measure of current flowing from the center electrode 402. A second signal line, passing through a grounded shield 816, is coupled to the conductive box 802 to provide a measure of the focus electrode voltage $V_P$ (which will be almost exactly equal to the measurement electrode voltage). These measurements can be demodulated and coupled to an analog-to-digital converter that captures the in-phase and quadrature-phase components to enable resistivity measurements.

As will be explained, the apparent resistivity measurements described above are ultimately used to determine standoffs between the micro-resistivity caliper 300 (more specifically, the surfaces of the stabilizers 120) and the borehole wall. These standoffs, in turn, are used to geometrically determine various parameters associated with the borehole—for example, borehole diameter and the location of the center of the borehole (and, thus, the position of the drill string and calipers relative to the center of the borehole).

Accordingly, in preferred embodiments, sensors of the types described above are placed on multiple stabilizers 120, and in such embodiments, the stabilizers are evenly spaced about the circumference of the tool upon which they are mounted. For example, if three sensors are placed on three stabilizers, the stabilizers may be separated by 120 degrees. In addition, to facilitate accurate measurements, in at least some embodiments the sensors take their measurements simultaneously and either while the caliper is non-rotating or while the caliper is rotating but has not rotated more than a predetermined amount (e.g., two azimuthal degrees). Furthermore, although much of this disclosure describes the sensors for micro-resistivity calipers being mounted on drill string stabilizers, the scope of disclosure is not limited as such. In some embodiments, sensors for micro-resistivity calipers may be mounted on drill strings in a different fashion, and they may be used in sondes in wireline applications as well.

Figure 9:
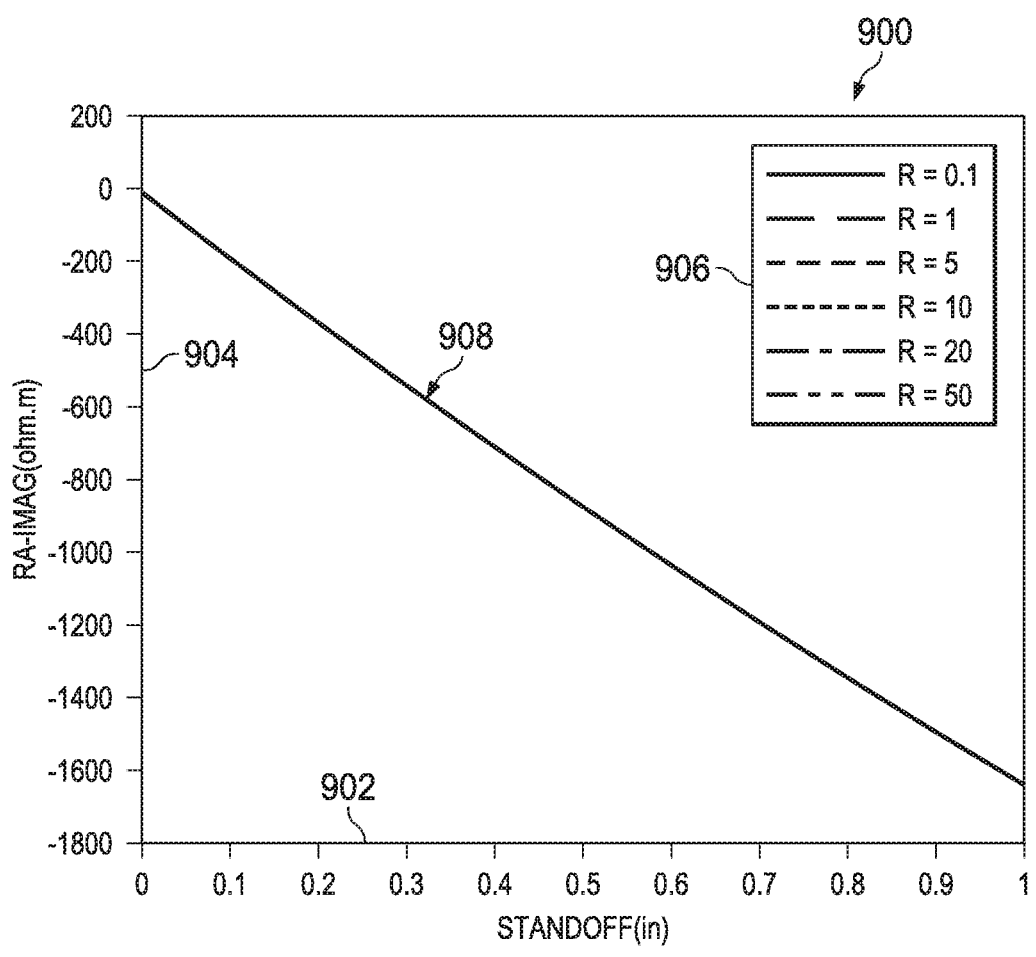
FIG. 9 is a graph representing a numerical model used to determine borehole standoffs.

Apparent resistivity measurements obtained as described above include both real and imaginary components. When high frequency currents (2 MHz) are used, the real part of the measurement dominates the signal, and when lower frequency currents (200 kHz) are used, the imaginary part of the measurement dominates. FIG. 9 is a graph 900 representing a numerical model expressing a relationship between the imaginary component of apparent resistivity measurements and standoffs. The graph 900 plots standoffs on the x-axis 902, and it plots the imaginary component of apparent resistivity on the y-axis 904. As legend 906 and numeral 908 indicate, the relationship shown in the graph 900 is valid for virtually any formation resistivity, including those between 0.1 kilo-ohms and 50 kilo-ohms, inclusive. The numerical model in the graph 900 may be used to determine a standoff based on the imaginary component of a given apparent resistivity measurement. The numerical model may be accessible to any processor or processors described herein and used to determine standoffs based on apparent resistivity measurements. In general, the following equation represents the line shown in graph 900:

$$y = -1666.66(x - 0.7) - 1200 \qquad (2)$$

where y is the imaginary component of the measured apparent resistivity in Ohm-meters and x is the standoff in inches.

Figure 10A:
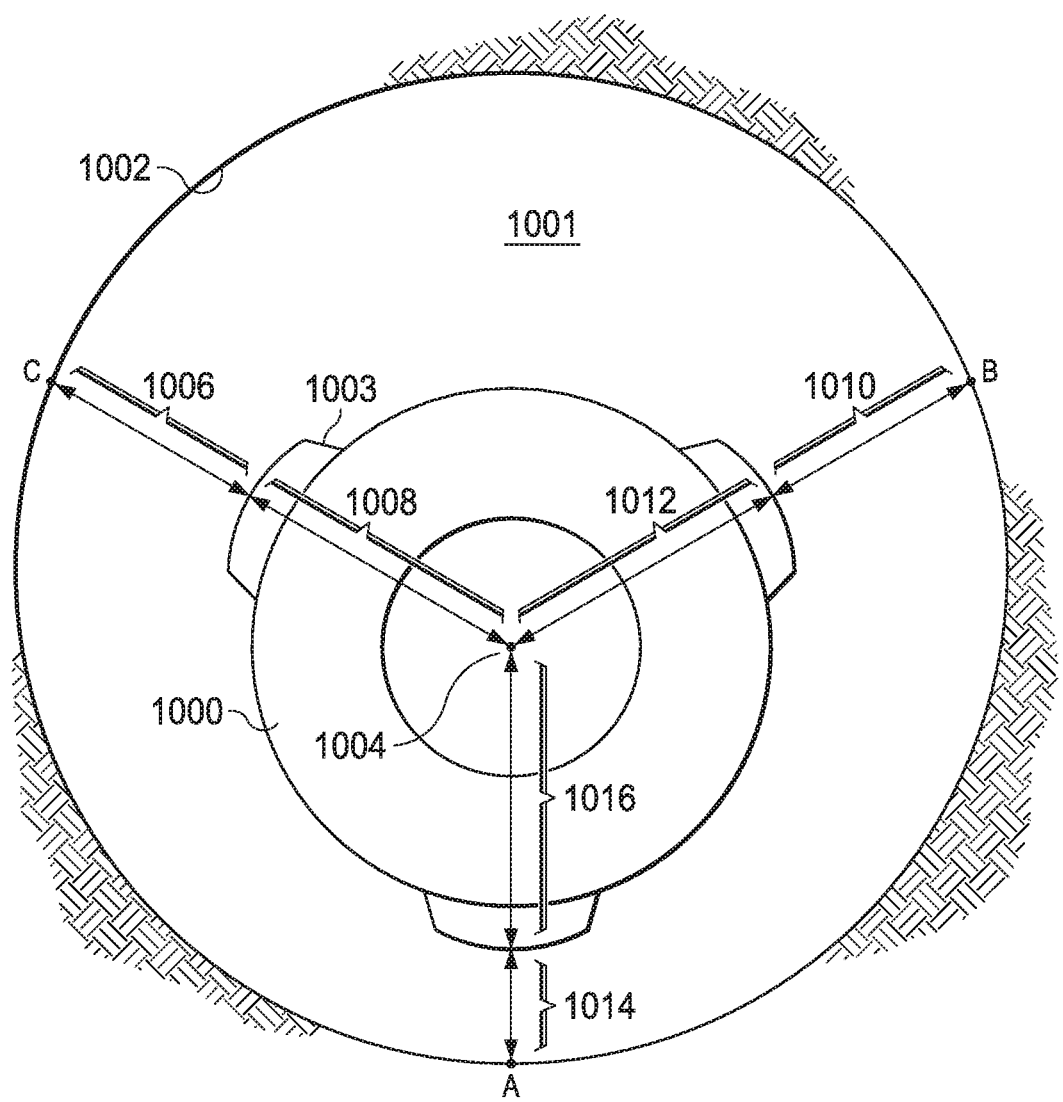
FIG. 10A is another cross-sectional view of a micro-resistivity caliper positioned within a borehole.
Figure 10B:
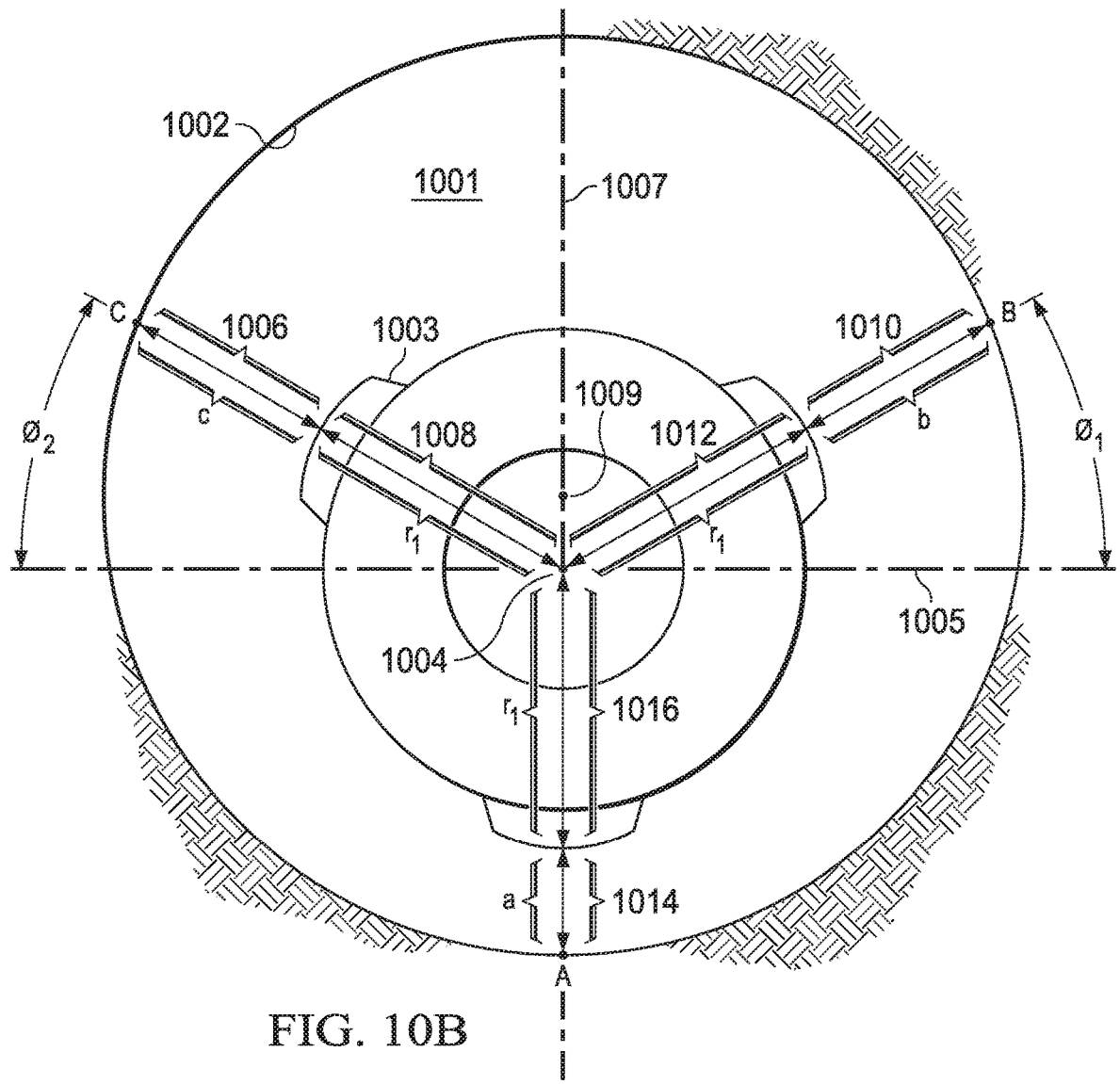
FIG. 10B is another cross-sectional view of a micro-resistivity caliper positioned within a borehole.

FIG. 10A is a cross-sectional view of a micro-resistivity caliper 1000 positioned within a borehole 1001 having a wall 1002 and is used to demonstrate the manner in which the micro-resistivity caliper's position within the borehole is determined. Specifically, and as described in detail above, the caliper 1000 has sensors (mounted on stabilizers 1003) that are used to perform apparent resistivity measurements that are subsequently used in tandem with a numerical model (e.g., the model shown in graph 900 of FIG. 9) to determine standoffs 1006, 1010, 1014. The caliper 1000 has a center 1004 and radii 1008, 1012 and 1016 (which include the widths of the stabilizers 1003). The standoffs depicted in FIGS. 10A-10B are exaggerated to facilitate description of the drawings; in typical applications, the standoffs may be substantially smaller than shown. Although three stabilizers (and, thus, three sensors and three standoffs) are shown in FIG. 10A, the scope of disclosure is not limited to any specific number of stabilizers (or sensors and corresponding standoffs). In boreholes suspected to have a primarily circular cross-sectional shape, three sensors are preferably used, and in boreholes suspected to have a primarily elliptical cross-sectional shape, five sensors are preferably used.

The standoffs 1006, 1010, 1014 may be combined with the radius of the caliper 1000 (e.g., radii 1008, 1012, 1016)

to determine the locations on the borehole wall upon which the micro-resistivity caliper's signals are incident. These borehole wall locations can then be used to mathematically determine the location of the center of the borehole and to determine the borehole radius or diameter, as described in greater detail below. Thus, for example, in FIG. 10A the standoffs 1006, 1010 and 1014 and the radius of the caliper 1000 (including the width of the stabilizers—for instance, radius 1008) can be used to determine the locations of points "A," "B" and "C" relative to the center 1004 of the caliper 1000. Once the locations of these three points are determined, the location of the center of the borehole relative to the center 1004 of the caliper 1000 and the radius of the borehole may be mathematically determined. The borehole radius may be doubled to produce the borehole diameter.

The borehole radius (or diameter) is a measurement that may be useful in any number of applications. The location of the center of the borehole relative to the center 1004 of the caliper 1000, however, provides additional utility because it effectively indicates the position of the caliper inside the borehole. If the caliper is off-center at a particular depth, then it is likely that other calipers—for example, an ultrasonic caliper—mounted on the same drill string or sonde also are off-center at that depth. Thus, the standoffs and the position of the micro-resistivity caliper inside the borehole are useful to correct data that was obtained using the ultrasonic caliper. For instance, ultrasonic calipers are often used to generate rugosity profiles, which are maps or images of the fine contours of the borehole wall. These rugosity profiles may be at least somewhat inaccurate due to the ultrasonic caliper's off-center position within the borehole. Thus, determining the position of the micro-resistivity caliper inside the borehole at a given depth sheds light on the likely position of the ultrasonic caliper within the borehole at the same depth. Accordingly, the standoffs, the borehole diameter, and/or the position of the micro-resistivity caliper inside the borehole may be used to correct the rugosity profile generated using the ultrasonic caliper, as described below.

FIG. 10B is identical to FIG. 10A, except that it includes x-axis 1005 and y-axis 1007 for a coordinate system that has as its origin the center 1004 of the micro-resistivity caliper 1000. In addition, FIG. 10B denotes the center 1009 of the borehole 1001. Accordingly, the coordinates of the center 1004 of the micro-resistivity caliper 1000 are (0, 0) and the coordinates of the center 1009 of the borehole 1001 are ($x_2$, $y_2$). The radius of the micro-resistivity caliper 1000 (including the widths of the stabilizers) is indicated by numerals 1008, 1012 and 1016 and is generally denoted for purposes of the following discussion as "$r_1$." The radius of the borehole 1001 (from center 1009 to the borehole wall) is generally denoted in the following discussion as "$r_2$" (not specifically shown in FIG. 10A). In addition, the standoff 1014 is denoted herein as "a," the standoff 1010 is denoted herein as "b," and the standoff 1006 is denoted as "c." Finally, in FIG. 10B, the polar angle $\varphi_1$ between the positive x-axis 1005 and the line between center 1004 and point B is 30 degrees. Similarly, the polar angle $\varphi_2$ between the negative x-axis 1005 and the line between the center 1004 and point C is 30 degrees. The actual values of angles $\varphi_1$ and $\varphi_2$ may vary based on the particular configuration of the sensors on the micro-resistivity caliper and, in some embodiments, additional angles may be used depending on the number of sensors deployed.

Given these assumptions, the coordinates of point "A" are (0, $-(r_1+a)$). The coordinates of point "B" are $((r_1+b)\cos(\varphi_1), a+(r_1+b)\sin(\varphi_1))$, and the coordinates of "C" are $(-(r_1+c)\cos(\varphi_2), a+(r_1+c)\sin(\varphi_2))$. The quantities $r_1$, $\varphi_1$ and $\varphi_2$ are known, while the quantities a, b and c are measured using the micro-resistivity caliper 1000. Using these known and measured quantities, the coordinates of points A (i.e., ($A_x$, $A_y$)), B (i.e., ($B_x$, $B_y$)) and C (i.e., ($C_x$, $C_y$)) can be determined. Once the coordinates of A, B and C are determined, they may be used in three equations to solve for three unknown quantities: $x_2$ and $y_2$, which are the coordinates of the center 1009 of the borehole 1001, and $r_2$, which is the radius of the borehole 1001. The basic equation used to solve for these three quantities is: $(x-x_2)^2-(y-y_2)^2=r_2$. Thus, in the example of FIG. 10B, the equations used to solve for ($x_2$, $y_2$) and $r_2$ are:

$$(A_x-x_2)^2-(A_y-y_2)^2=r_2$$

$$(B_x-x_2)^2-(B_y-y_2)^2=r_2$$

$$(C_x-x_2)^2-(C_y-y_2)^2=r_2$$

Because ($A_x$, $A_y$), ($B_x$, $B_y$) and ($C_x$, $C_y$) are known, there are only three unknowns ($x_2$, $y_2$, $r_2$), which can be determined using the foregoing three equations. In this way, the center 1009 of the borehole 1001 and the radius of the borehole 1001 are determined using micro-resistivity measurements.

Figure 10C:
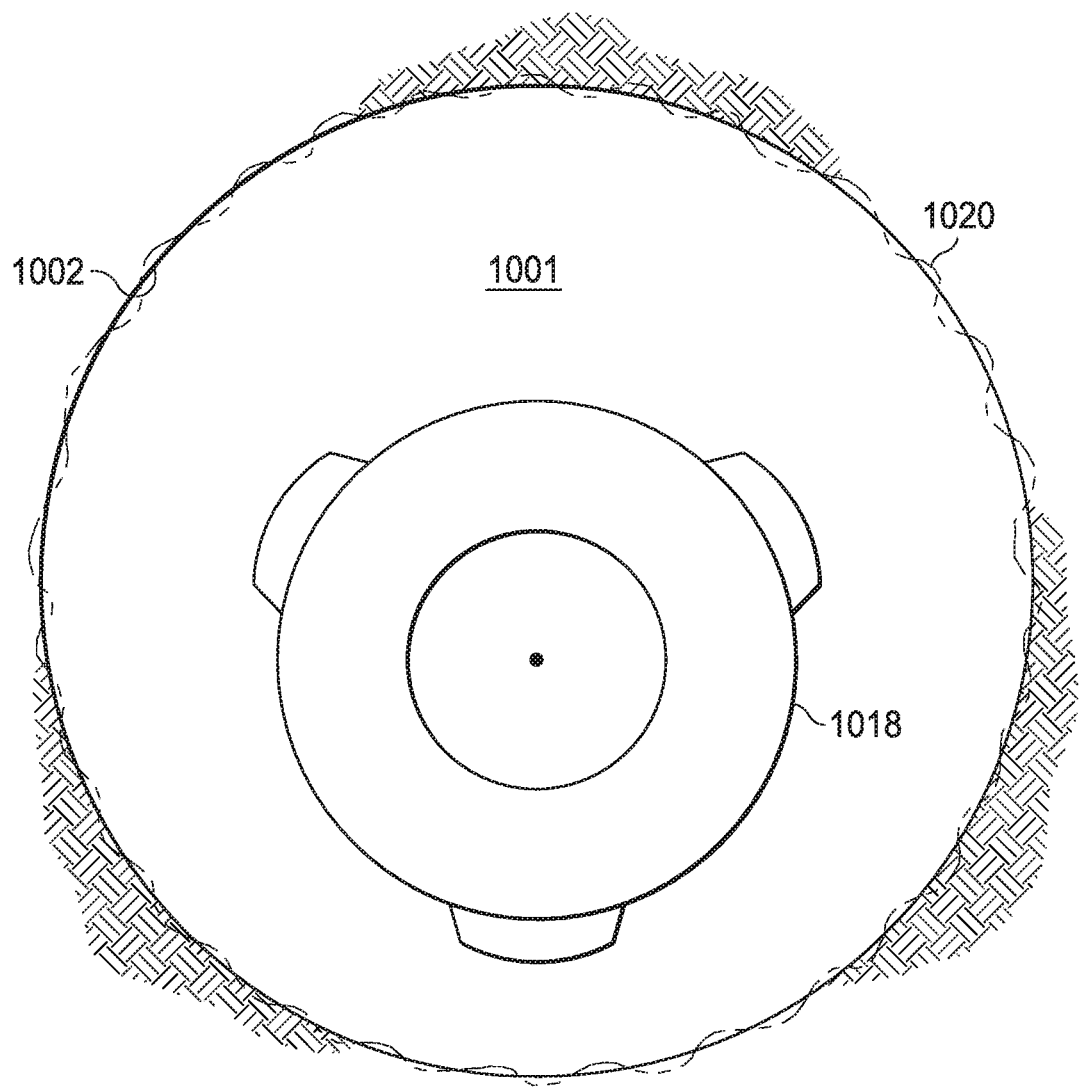
FIG. 10C is a cross-sectional view of a borehole wall with a corresponding rugosity profile.

FIG. 10C is a cross-sectional view of an ultrasonic caliper 1018 positioned within a borehole 1001 having a wall 1002 and shows an illustrative rugosity profile 1020 superimposed upon a base shape of the borehole. Specifically, high-resolution sensors, such as ultrasonic sensors within the ultrasonic caliper 1018, are used according to well-known techniques to determine a rugosity profile of the borehole. A rugosity profile is formed using an extensive set of radius or diameter measurements of the borehole, with enough data points in the set of measurements so that the minute contours of the borehole wall may be identified. The exact number of measurements required to generate a rugosity profile is variable and depends on numerous factors, including the degree of resolution desired. As shown in FIG. 10C, an ultrasonic caliper may be used to obtain a rugosity profile 1020 that shows the detailed contours of the borehole wall. The rugosity profile 1020 is superimposed on the assumed circular base shape of the borehole, as shown in FIG. 10C. However, as previously explained, an ultrasonic caliper that is not centered within the borehole may produce a skewed rugosity profile based on inaccurate ultrasonic measurements. In addition, such eccentricity can increase some standoff distances between the ultrasonic caliper and the borehole wall, which, in turn, can skew ultrasonic measurements. Accordingly, one or more of the parameters obtained above using micro-resistivity measurements—namely, standoffs, borehole diameter and/or borehole center—can be used to correct the rugosity profile, since the degree to which the micro-resistivity caliper is eccentrically located at a particular depth is likely to be the same degree to which the ultrasonic caliper is eccentrically located at that same depth. The ways in which the initial rugosity profile is corrected to produce a corrected profile is now described.

The amplitudes of ultrasonic signals reflected from a borehole wall—for example, those used to generate a rugosity profile—can be affected by the eccentric location of the ultrasonic caliper within the borehole in at least three different ways. First, as standoff coincident with the measurement path of an ultrasonic sensor increases, ultrasonic amplitude decreases exponentially due to attenuation in the borehole mud. This effect can be corrected by multiplying the measured amplitude by $e^{2\alpha d}$, where $\alpha$ is the attenuation coefficient of the mud and d is the standoff coincident with the measurement path of the ultrasonic sensor in question (assuming that the micro-resistivity sensor and ultrasonic sensor are similarly azimuthally oriented within the borehole). The attenuation coefficient can be measured or estimated using the known lab empirical relationship between the attenuation, the mud type and the mud weight. The standoff may be determined using the multi-resistivity caliper as described above.

Second, signal beams emitted by an ultrasonic caliper propagate according to a radiation pattern. The radiation pattern of the beam typically has a substantially triangular shape due to signal spread that increases with distance. The beam generally has a center, or axis, at which amplitude is greatest, and which is flanked on both sides by lesser amplitudes. The ultrasonic beam spreads out as standoff increases. This spread reduces the ultrasonic energy reflected back to the ultrasonic sensor in the caliper as the standoff increases. The precise parameters of this radiation pattern may easily be determined in a laboratory as a function of standoff distance and may be used to correct ultrasonic sensor measurements. For instance and without limitation, if a particular ultrasonic sensor loses a hypothetical five percent of total emitted energy for each centimeter of standoff, the standoff measurement in a particular drilling operation (again, assuming similarly-oriented micro-resistivity and ultrasonic sensors) may be multiplied by five percent to determine energy loss between the sensor and the borehole wall, and that quantity may be doubled to account for energy loss between the borehole wall and the sensor. Having calculated total energy loss due to the radiation pattern, the ultrasonic caliper measurements may be corrected accordingly.

Figure 11:
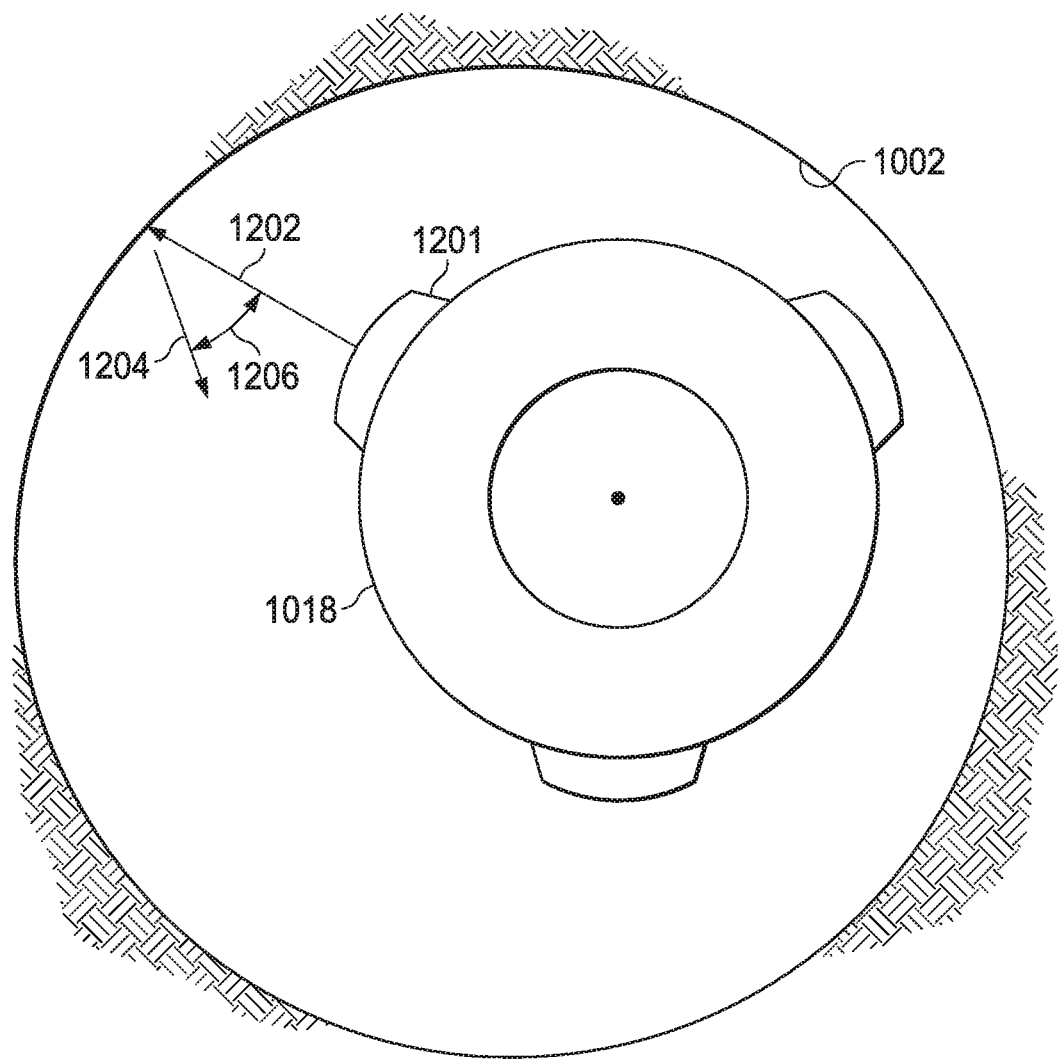
FIG. 11 is a cross-sectional view of an ultrasonic caliper within a borehole.

Third, deviation from normal wave incident due to caliper position eccentricity causes inaccurate ultrasonic measurements. FIG. 11 illustrates this phenomenon. Specifically, FIG. 11 shows an ultrasonic caliper 1018 in a borehole with a wall 1002. The ultrasonic caliper 1018 contains at least one ultrasonic transducer 1201 (e.g., including a signal emitter and signal sensor) that emits an acoustic signal 1202 toward wall 1002. Given the orientation of the ultrasonic transducer 1201 relative to that of the portion of the wall 1002 upon which the signal 1202 is incident, the signal 1202 does not strike the wall 1002 at a normal angle and, thus, the signal 1202 is reflected at an angle 1206 as signal 1204. (Had the signal 1202 been incident on the wall 1002 at a normal angle, the signal 1204 would have returned directly to the transducer 1201.) The angle 1206 is the combination of the incident angle and the reflection angle, although other angles may be used for other computation techniques. Although the transducer 1201 receives at least some of the reflected signal 1204 due to the signal 1204's spreading radiation pattern, it does not receive the bulk, or "centerline," of the signal 1204. Thus, the total reflected energy that the transducer 1201 receives is relatively low. To correct this effect, the angle 1206 is determined based on both the location of the caliper 1018 relative to the center of the borehole, which may be determined using the techniques described above, and the orientation of the transducer 1201, which is known. For instance, in some embodiments, modeling software may be used to re-create the downhole geometric conditions—including borehole diameter, caliper diameter, position of caliper within the borehole, standoffs and sensor orientation—to determine the angle 1206. In other embodiments, the angle 1206 may be determined geometrically. In any event, the radiation pattern of the signal—the characteristics of which may be easily determined in a laboratory, as explained above—is used in tandem with the angle 1206 and the standoff to estimate the amount of energy lost as a result of the angle 1206 (again, assuming similarly-oriented micro-resistivity and ultrasonic sensors). The ultrasonic caliper signal measurements may then be corrected using the amount of energy lost to obtain more accurate signal measurements. Ultrasonic signal measurements corrected using the foregoing three techniques (and any other suitable techniques) may then be used to generate the corrected rugosity profile.

Figure 12:
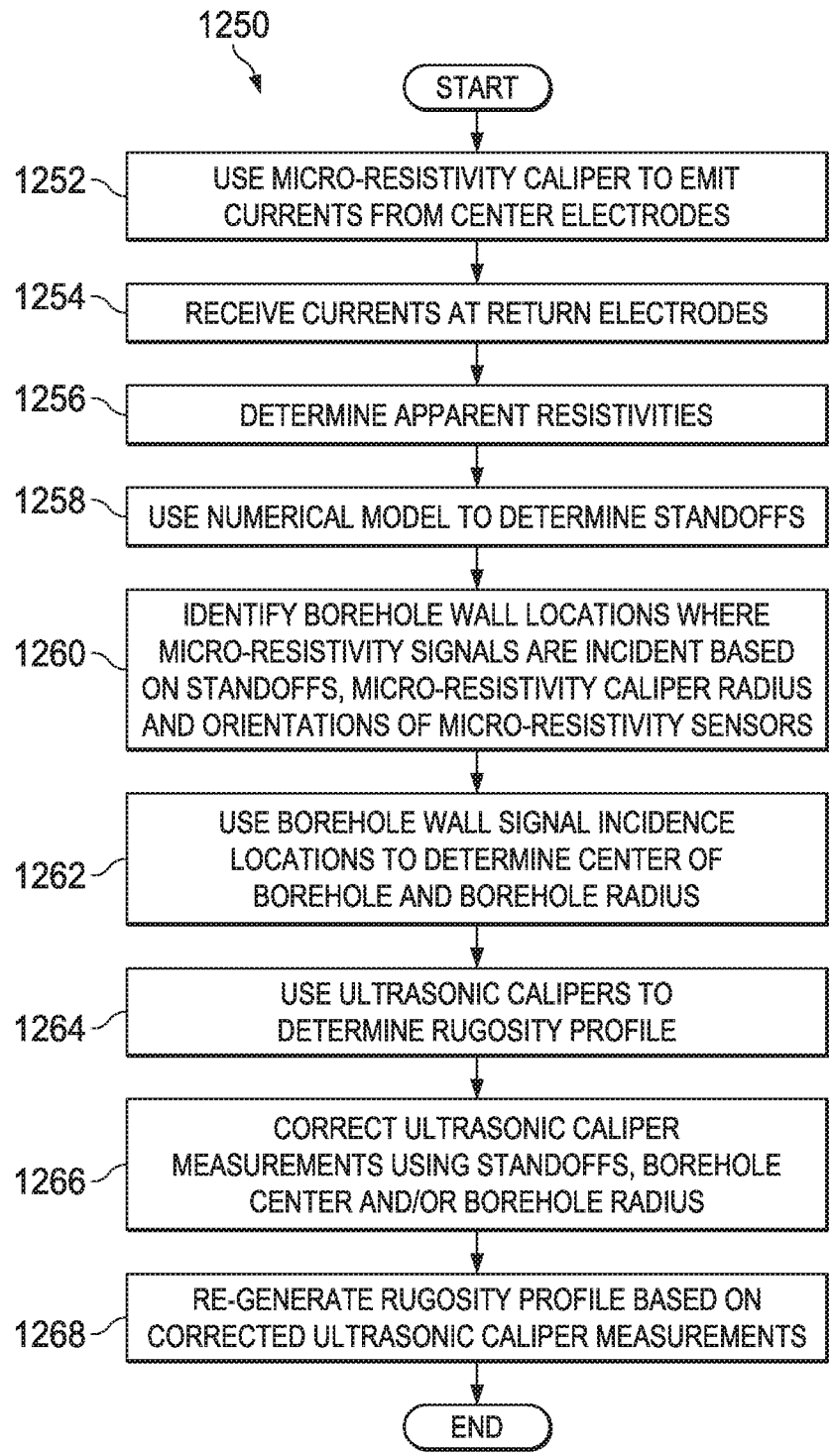
FIG. 12 is a flow diagram of a method for determining borehole parameters using ultrasonic and micro-resistivity calipers.

FIG. 12 is a flow diagram of a method 1250 for producing a corrected image of a borehole wall. The method 1250 includes using a micro-resistivity caliper to emit currents from center electrodes (step 1252) and receiving the currents at return electrodes (step 1254). The center and return electrodes used, for example, may be arranged as depicted in FIGS. 4-6, although other configurations are contemplated and included within the scope of this disclosure. The method 1250 next comprises determining the apparent resistivities using the received signals (step 1256) and using a numeral model—such as that shown in FIG. 9 and described above—to determine standoffs based on the apparent resistivities (step 1258). Next, the borehole wall locations upon which the micro-resistivity signals were incident are identified (step 1260). Illustrative borehole wall locations of this type include points A, B and C in FIGS. 10A-10B. These points are determined based on the standoffs, micro-resistivity caliper radius and orientations of the micro-resistivity sensors, as previously described. The method 1250 then includes using these identified points to geometrically determine the center of the borehole and the borehole radius (step 1262). This step may be performed by a human or using any suitable computer modeling software. Ultrasonic calipers are used to determine a rugosity profile (or "image") of the borehole at the same depth at which the foregoing micro-resistivity measurements were performed (step 1264). It is not necessary that the ultrasonic caliper measurements be performed before or after the micro-resistivity caliper measurements; these measurements may be performed in any desired order. The method 1250 next includes correcting the ultrasonic caliper measurements using one or more of the standoffs, borehole center location and/or borehole radius, all three of which may be determined using the micro-resistivity measurements as explained above (step 1266). Finally, the method 1250 comprises re-generating the rugosity profile based on the corrected ultrasonic caliper measurements (step 1268). The method 1250 may be modified as desired—for instance, by adding, deleting or rearranging steps.

At least some embodiments are directed to a micro-resistivity caliper, comprising: a cylindrical body; multiple center electrodes, arranged circumferentially about the cylindrical body, to emit current into a borehole and toward a borehole wall; multiple focus electrodes to limit dispersion of the current emitted by the center electrodes, each of the focus electrodes surrounding a different center electrode; multiple return electrodes to receive the current emitted by the center electrodes, each of the return electrodes surrounding a different focus electrode; and one or more processors, coupled to the return electrodes, to determine one or more standoffs between the micro-resistivity caliper and the borehole wall based on the currents received from the multiple return electrodes. These embodiments may be supplemented using one or more of the following concepts, in any order and in any combination: wherein the one or more processors use the standoffs, a radius of the micro-resistivity caliper, and an orientation of one or more of the multiple return electrodes to determine one or more points on the borehole wall upon which said current was incident; wherein the one or more processors use said one or more points on the borehole wall to identify a center location of the borehole; wherein the one or more processors use the one or more points on the borehole wall to identify a radius of the borehole; wherein the one or more processors correct a rugosity profile of the borehole wall using information selected from the group consisting of: a center location of the borehole, a radius of the borehole, and at least one of said one or more standoffs; wherein the rugosity profile is an ultrasonic-caliper-generated rugosity profile; wherein the one or more processors correct a rugosity profile of the borehole wall based on a degree of ultrasonic signal attenuation caused by drilling mud; wherein said signal attenuation is a function of standoff; wherein the one or more processors correct a rugosity profile of the borehole wall based on a degree of ultrasonic signal attenuation caused by a radiation pattern of said current; wherein the signal attenuation is a function of standoff; wherein the one or more processors correct a rugosity profile of the borehole wall based on an angle between said current emitted toward the borehole wall and said current after reflecting off of the borehole wall; wherein the center, focus and return electrodes are positioned on a drill string stabilizer.

At least some embodiments are directed to a drill string in a borehole, comprising: a micro-resistivity caliper to determine one or more of a radius of the borehole, a center location of the borehole, and standoffs between the drill string and a borehole wall; an ultrasonic caliper to determine a rugosity profile of the borehole wall; and one or more processors, coupled to the micro-resistivity and ultrasonic calipers, to correct the rugosity profile using one or more of the radius of the borehole, the center location of the borehole, and said standoffs. These embodiments may be supplemented using one or more the following concepts, in any order and in any combination: wherein the micro-resistivity caliper detects apparent resistivities of a formation surrounding the borehole and of mud within said borehole, said apparent resistivities having real and imaginary components; wherein the micro-resistivity caliper uses a numerical model to determine the standoffs using the imaginary components, said numerical model expresses a relationship between multiple potential standoffs and multiple potential imaginary components; wherein said relationship is expressed by the equation $y=-1666.66(x-0.7)-1200$, wherein y is an imaginary part of an apparent resistivity in Ohm-meters measured using the micro-resistivity caliper, and wherein x is a standoff in inches; wherein the micro-resistivity caliper includes sensors mounted on one or more drill string stabilizers.

At least some embodiments are directed to a method for determining one or more borehole parameters, comprising: emitting currents from multiple center electrodes toward a formation, the multiple center electrodes positioned circumferentially about a micro-resistivity caliper in a borehole; receiving said currents from the formation at multiple return electrodes, each of the multiple return electrodes surrounding a different center electrode; analyzing the received currents to determine apparent resistivities of the formation and of drilling mud within the borehole; and using the apparent resistivities to determine one or more standoffs based on a numerical model. These embodiments may be supplemented using one or more of the following concepts, in any order and in any combination: further comprising using the one or more standoffs, a radius of the micro-resistivity caliper, and an orientation of one or more sensors coupled to the micro-resistivity caliper to determine a center of the borehole and a radius of the borehole; further comprising correcting a rugosity profile of a borehole wall using the center of the borehole, the radius of the borehole, said one or more standoffs, or a combination thereof.

The following is claimed:

1. A micro-resistivity caliper, comprising:
a cylindrical body; multiple center electrodes, arranged circumferentially about the cylindrical body, to emit current into a borehole and toward a borehole wall;
multiple focus electrodes to limit dispersion of the current emitted by the center electrodes, each of the focus electrodes surrounding a different center electrode;
multiple return electrodes to receive the current emitted by the center electrodes, each of the return electrodes surrounding a different focus electrode; and
one or more processors, coupled to the return electrodes, to determine one or more standoffs between the micro-resistivity caliper and the borehole wall based on the currents received from the multiple return electrodes.

2. The micro-resistivity caliper of claim 1, wherein the one or more processors use the standoffs, a radius of the micro-resistivity caliper, and an orientation of one or more of the multiple return electrodes to determine one or more points on the borehole wall upon which said current was incident.

3. The micro-resistivity caliper of claim 2, wherein the one or more processors use said one or more points on the borehole wall to identify a center location of the borehole.

4. The micro-resistivity caliper of claim 2, wherein the one or more processors use the one or more points on the borehole wall to identify a radius of the borehole.

5. The micro-resistivity caliper of claim 1, wherein the one or more processors correct a rugosity profile of the borehole wall using information selected from the group consisting of: a center location of the borehole, a radius of the borehole, and at least one of said one or more standoffs.

6. The micro-resistivity caliper of claim 5, wherein the rugosity profile is an ultrasonic-caliper-generated rugosity profile.

7. The micro-resistivity caliper of claim 1, wherein the one or more processors correct a rugosity profile of the borehole wall based on a degree of ultrasonic signal attenuation caused by drilling mud.

8. The micro-resistivity caliper of claim 7, wherein said signal attenuation is a function of standoff.

9. The micro-resistivity caliper of claim 1, wherein the one or more processors correct a rugosity profile of the borehole wall based on a degree of ultrasonic signal attenuation caused by a radiation pattern of said current.

10. The micro-resistivity caliper of claim 9, wherein the signal attenuation is a function of standoff.

11. The micro-resistivity caliper of claim 1, wherein the one or more processors correct a rugosity profile of the borehole wall based on an angle between said current emitted toward the borehole wall and said current after reflecting off of the borehole wall.

12. The micro-resistivity caliper of claim 1, wherein the center, focus and return electrodes are positioned on a drill string stabilizer.

13. A drill string in a borehole, comprising:
a micro-resistivity caliper to determine one or more of a radius of the borehole, a center location of the borehole, and standoffs between the drill string and a borehole wall;
an ultrasonic caliper to determine a rugosity profile of the borehole wall; and one or more processors, coupled to the micro-resistivity and ultrasonic calipers, to correct the rugosity profile using one or more of the radius of the borehole, the center location of the borehole, and said standoffs.

14. The drill string of claim 13, wherein the micro-resistivity caliper detects apparent resistivities of a formation surrounding the borehole and of mud within said borehole, said apparent resistivities having real and imaginary components.

15. The drill string of claim 14, wherein the micro-resistivity caliper uses a numerical model to determine the standoffs using the imaginary components, said numerical model expresses a relationship between multiple potential standoffs and multiple potential imaginary components.

16. The drill string of claim 15, wherein said relationship is expressed by the equation $y=-1666.66(x-0.7)-1200$, wherein y is an imaginary part of an apparent resistivity in Ohm-meters measured using the micro-resistivity caliper, and wherein x is a standoff in inches.

17. The drill string of claim 13, wherein the micro-resistivity caliper includes sensors mounted on one or more drill string stabilizers.

18. A method for determining one or more borehole parameters, comprising:

emitting currents from multiple center electrodes toward a formation, the multiple center electrodes positioned circumferentially about a micro-resistivity caliper in a borehole;

receiving said currents from the formation at multiple return electrodes, each of the multiple return electrodes surrounding a different center electrode;

analyzing, by one or more processors, the received currents to determine apparent resistivities of the formation and of drilling mud within the borehole; and using the apparent resistivities to determine one or more standoffs based on a numerical model.

19. The method of claim 18, further comprising using the one or more standoffs, a radius of the micro-resistivity caliper, and an orientation of one or more sensors coupled to the micro-resistivity caliper to determine a center of the borehole and a radius of the borehole.

20. The method of claim 19, further comprising correcting a rugosity profile of a borehole wall using the center of the borehole, the radius of the borehole, said one or more standoffs, or a combination thereof.

* * * * *